INVENTOR
RICHARD R. JUNG
ATTORNEYS

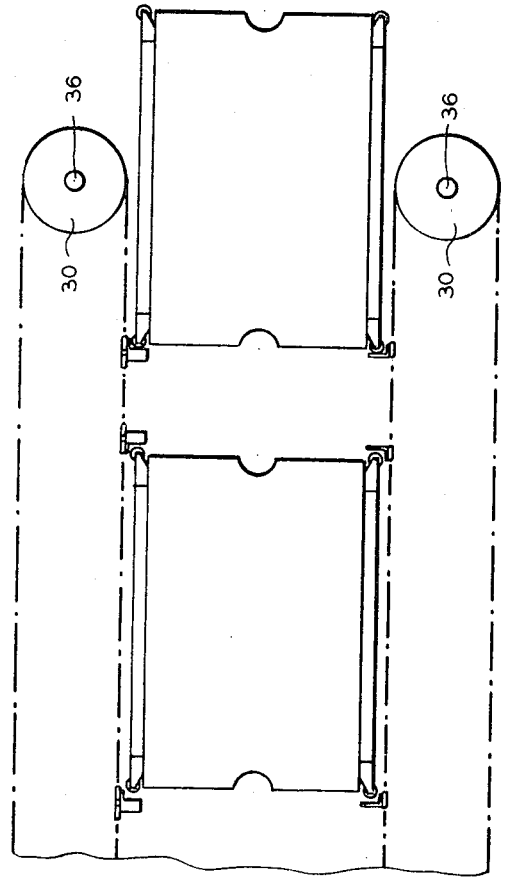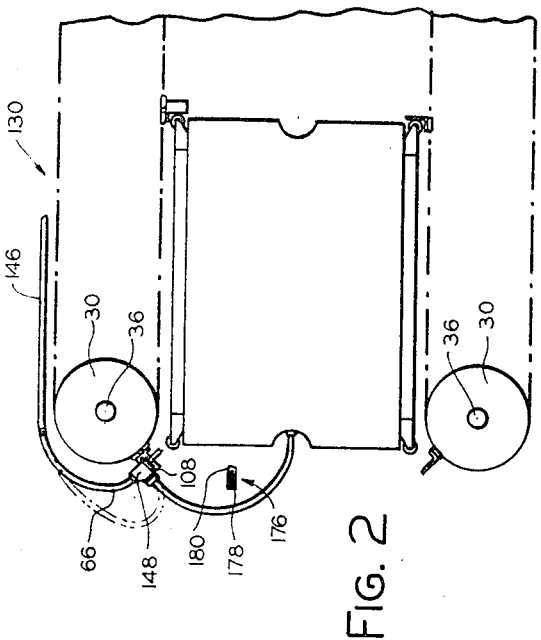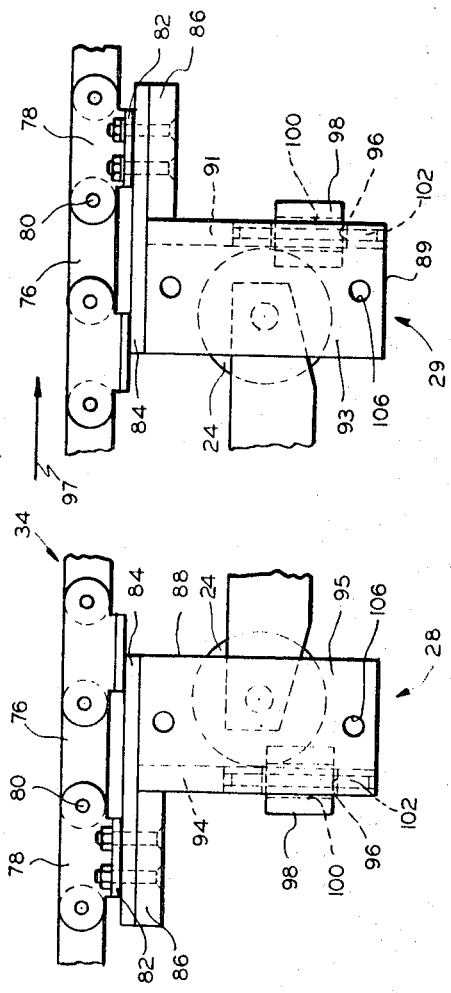

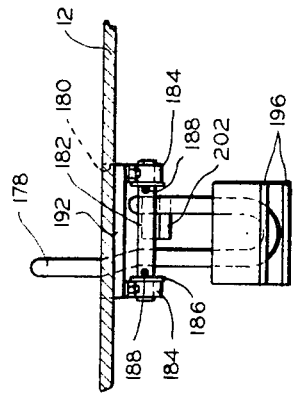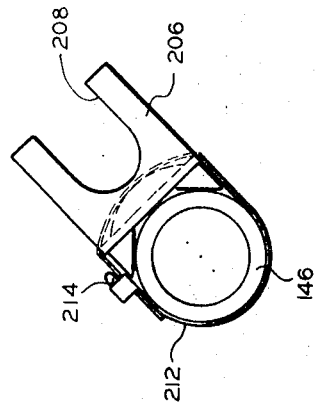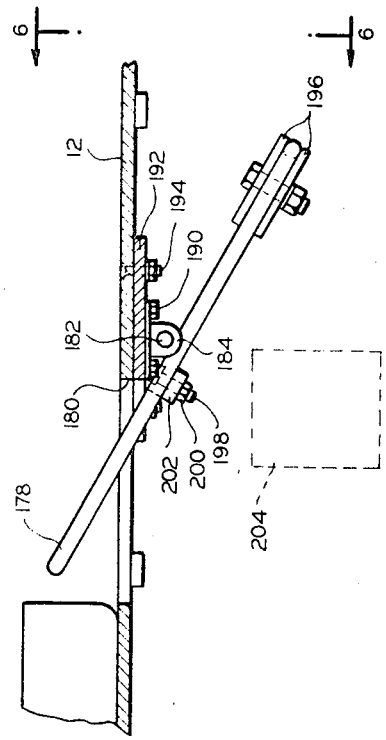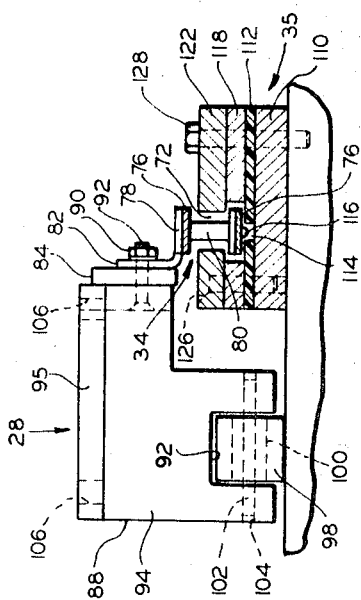

United States Patent Office 3,443,838
Patented May 13, 1969

3,443,838
PALLET CONVEYOR ARRANGEMENT
Richard R. Jung, Battle Creek, Mich., assignor to Clark Equipment Company, a corporation of Michigan
Filed May 4, 1967, Ser. No. 636,145
Int. Cl. B65g 53/02, 7/06
U.S. Cl. 302—29                17 Claims

ABSTRACT OF THE DISCLOSURE

A arrangement for effecting movement of material handling pallets having inflatable fluid pressure pads thereon along a support surface, including a pair of movable endless conveyor chains, guide members supported in spaced relation on the conveyor chains and movable therewith to engage pallets for movement along the support surface, and fluid pressure supply conduit means operatively associated with one of the conveyor chains to supply fluid pressure to the inflatable pads of the pallets as they are moved along the support surface by the guide members.

Background of the invention

In the field of material handling, and in particular systems utilizing material handling pallets having inflatable pads on the undersides thereof which establish a thin fluid film between the pallet and a supporting surface, it is necessary to provide a continuous supply of fluid pressure to the inflatable pads during movement of the pallets along support surfaces. In systems employing pallets to move work pieces and the like through test stations and other production areas, it is common to provide means to guide the pallets along a definite path with the pallets being stopped at intervals along the path during which time tests or other operations are performed. It has been found that endless conveyor chains supported in driven relation on sprockets and having pallet engaging guide members thereon provide efficient means for moving the pallets through the test stations. As noted, where such systems employ fluid pressure type pallets, the inflatable pads of the pallets must be continually supplied with fluid pressure to maintain the thin fluid film over which the pallets ride. It is desirable that the fluid pressure supply means be relatively compact and not employ long lengths of fluid pressure conduits which are of sufficient length to be continually connected to the pallets as they are moved through the test area. Such long lengths of fluid pressure conduits tend to become entangled and oftentimes get in the way of the operators or become entangled in supporting structures adjacent the working or test areas, thus greatly reducing the overall efficiency of the systems.

Summary of the invention

It is one of the primary objects of the present invention to provide a novel fluid pressure supply arrangement for continually supplying fluid pressure to pallets having inflatable pads thereon as the pallets are moved in guided relation along a supporting surface, and which arrangement thereby eliminates the need for lengthy extensions of fluid pressure supply conduits.

Another object of the present invention is to provide a novel fluid pressure supply arrangement for supplying fluid pressure to the inflatable pads of material handling pallets as they are moved in guided relation along a support surface, which arrangement is operatively associated with the means for moving the pallet and includes a continuous length fluid pressure conduit having relatively short fixed lengths of conduit connected thereto which are adapted to supply fluid pressure to the inflatable pads.

Another object of the present invention is to provide a fluid pressure supply arrangement for use in supplying fluid pressure to the inflatable pads of material handling pallets as they are moving along a supporting surface, which fluid supply arrangement includes a continuous length fluid pressure conduit connected to a linearly reciprocable fluid pressure supply conduit through a swivel coupling to allow continual fluid pressure supply to the pads.

Another object of the present invention is to provide an arrangement for controllably guiding material handling pallets of the type having inflatable pads on the undersides thereof along a support surface, which arrangement includes endless conveyor chain means having pallet engaging guide members secured thereto for moving the pallets along the support surface, and a continuous length fluid pressure conduit operatively associated with the endless conveyor chain and adapted to receive fluid pressure from a linearly reciprocable fluid pressure conduit and supply fluid pressure to the inflatable pads of the pallets through individual short lengths of conduit.

Another object of the present invention is to provide an arrangement for moving material handling pallets along a supporting surface as described, which arrangement includes a control switch operable by engagement with pallets approaching the chain means and adapted to prevent movement of the conveyor chains until the pallet is positioned to be properly engaged by the guide members for movement therewith.

In a preferred embodiment of an arrangement for moving material handling pallets of the type having inflatable pads on the undersides thereof along a support surface while continually supplying fluid pressure to the inflatable pads, a pair of endless conveyor chains are supported in guided driven relation on pairs of spaced sprockets such that the chains define a path therebetween along which the pallets are moved on the support surface. A plurality of guide members are supported in spaced relation on the chains and serve to engage the pallets for moving them along the support surface. A continuous length fluid pressure conduit is operatively associated with one of the conveyor chains for movement therewith and has a plurality of relatively short length fluid conduits connected thereto which are adapted to supply fluid pressure to the inflatable pads of the pallets during movement thereof along the supporting surface between the conveyor chains. A linearly reciprocable fluid conduit is connected to the continuous length conduit through a swivel coupling such that fluid pressure communication is maintained between the reciprocable supply conduit and the continuous length conduit at all times. A control switch is positioned forwardly of the conveyor path and includes a control lever operable upon engagement by a pallet to prevent movement of the conveyor chans until the lever engaging pallet has been moved to a position wherein the guide members properly engage the pallet for movement along the path.

Further objects and advantages of my invention, together with the organization and manner of operation thereof, may best be understood by reference to the following description of a preferred embodiment of the invention when taken in conjunction with the accompanying drawings, in which like reference numerals designate like parts throughout the several views.

Brief description of the drawings

FIGURE 2 is a top plan view of the arrangement illustrated in FIGURE 1 for moving the pallets and providing continual fluid pressure thereto;

FIGURE 3 is a partial vertical sectional view taken substantially along the line 3—3 of FIGURE 1, viewed in the direction of the arrows, illustrating a conveyor chain guided within a chain track and having a driven guide member secured to the chain.

FIGURE 4 is a top plan view of a segment of the conveyor chain having a guide member secured thereto;

FIGURE 5 is a vertical side view, taken partly in section, illustrating a conveyor chain control switch mounted on the support surface;

FIGURE 6 is a vertical end view, taken substantially along the line 6—6 of FIGURE 5, showing the conveyor chain control switch illustrated in FIGURE 5; and FIGURE 7 is a vertical sectional view illustrating a conduit retaining bracket to receive the outer end of a short length fluid pressure supply conduit when not in use.

Description of a preferred embodiment

Figure 1:
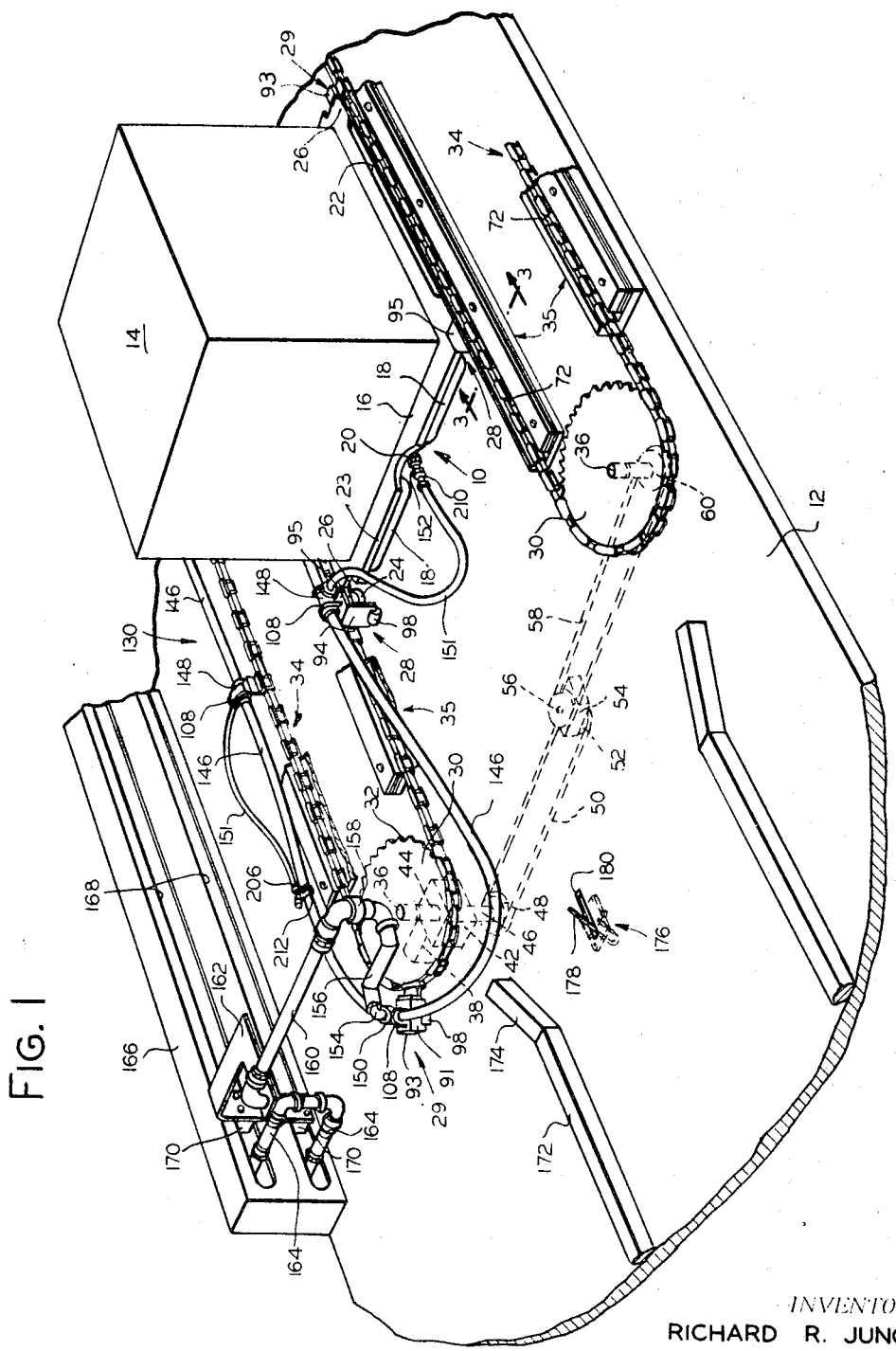
FIGURE 1 is a perspective view of an arrangement in accordance with the present invention for controllably moving material handling pallets having inflatable pads thereon along a support surface, illustrating the endless conveyor chains and guide members for effecting movement of the pallets and the fluid pressure supply means for continually supplying fluid pressure to the inflatable pads during movement of the pallets between the endless conveyor chains.

Referring now to the drawings, and in particular to FIGURE 1, a preferred embodiment of an arrangement for moving material handling pallets having inflatable pads thereon along a support surface and continually supplying fluid pressure to the inflatable pads is illustrated in perspective. A material handling pallet, indicated generally at 10, having a load 14 thereon is adapted for movement along a support surface 12 which may comprise the supporting platform or surface of an assembly area or test area in a production facility wherein it is desired to controllably move the pallet and its load through the test area. The material handling pallet 10 is of the type adapted to produce a thin fluid film between the undersurface of the pallet and the support surface 12 such that the pallet rides on the thin fluid film, thus substantially reducing the coefficient of friction between the pallet and the supporting surface. The material handling pallet includes a generally rectangular planar platform member 16 which supports the load 14 thereon and has a plurality of inflatable pads 18 suitably mounted on the undersurface thereof. A fluid pressure conduit inlet coupling 20, preferably of the conventional quick disconnect type, is suitably secured to the underside of the platform 16 intermediate the inflatable pads 18 and is coupled to the inflatable pads to supply fluid pressure thereto in a manner to be more fully described hereinbelow. The inflatable pads 18 have a plurality of orifices (not shown) in the undersurfaces thereof adjacent the support surface 12 which exhaust fluid pressure therefrom when the inflatable pads are supplied with fluid pressure, such as air, to thereby produce the above described thin fluid film over which the pallet 10 rides during movement on the support surface. For a more detailed description of the inflatable pads 18 and their operative association with the fluid pressure inlet 20, reference may be had to the copending application of Venkat K. Swamy, Ser. No. 503,175, filed Oct. 23, 1965, now Patent No. 3,392,800, and assigned to the assignee of the present invention. The platform 16 includes side edge portions 22 and end edge portions 23 and preferably has a roller member 24 rotatably supported adjacent each of the corners of the platform. The roller members 24 are suitably rotatably mounted on projecting portions 26 of the platform 16 such that the outermost peripheral surface portions of the rollers extend outwardly beyond the edge portions 22, 23 of the platform. The roller members 24 serve to engage movable guide means comprising rear and forward guide members, indicated generally at reference numerals 28 and 29, respectively, for controlled movement of the pallet 10 and its associated load 14 along the support surface 12. The rollers 24 further provide rolling engagement between the pallet and adjacent chain track members 35 when the pallet engages the track members during movement along surface 12 as will become more apparent hereinbelow.

Referring to FIGURE 1, taken in conjunction with FIGURE 2, movable means for effecting controlled movement of the pallets 10 along the support surface 12 are mounted on support surface and include a plurality of spaced sprocket members 30, a pair of conveyor chains 34, and the guide means comprising guide members 28, and 29. Preferably, four identical sprocket members 30 are rotatably supported above the support surface 12, in pairs of two such that lines connecting the axes of rotation of the respective pairs of sprocket members are in substantially parallel spaced relation. The sprocket members 30 are of conventional design and include a plurality of teeth 32 circumferentially spaced about the periphery of the sprockets. The sprocket members 30 and their associated teeth 32 serve to support the pair of endless conveyor chains 34 such that the conveyor chains and their respective supporting sprockets 30 lie in generally coplanar relation with their common plane being parallel to and spaced above the support surface 12. As noted, the sprocket members 30 are supported such that lines connecting the center axes of the respective pairs of sprockets are in parallel relation. The opposing lengths of the conveyor chains 34 disposed between the sprocket members 30 are thus in parallel relation and are spaced apart a distance slightly greater than the widths of the pallets 10 to define a path therebetween which receives the pallets for controlled movement along the support surface 12.

The sprocket members 30 are supported above the support surface 12 on rotatably mounted support shafts 36 with the sprocket members being fixedly secured to their respective support shafts in any suitable manner. The support shafts 36 are disposed in generally normal relation to the support surface 12 and are suitably rotatably mounted in corresponding apertures in the support surface to maintain their respective sprocket members 30 in fixed spaced relation above the support surface. Means are provided for driving at least one sprocket member 30 of each pair of sprocket members to effect translational movement of the conveyor chains 34, which drive means are preferably located and supported below the support platform 12. While any suitable means for effecting such driving rotation may be provided which accomplishes the desired purpose, an electric drive motor 38 having a conventional speed reducer 42 secured to the output shaft thereof is shown suitably supported below the support surface 12. The speed reducer 42 has an upper rotatably driven output shaft 44 formed integral with or otherwise suitably connected in axial relation to a support shaft 36 of one of the sprocket members 30. The speed reducer 42 also has a rotatably driven output shaft 46 which extends downwardly in normal relation to the support surface 12 and has a sprocket member 48 suitably secured in normal relation to the lower end thereof. The sprocket member 48 has a conventional endless chain 50 operatively associated therewith, with the chain being also operatively associated with a second sprocket member 52 which provides the input rotation for a conventional rotation reversing assembly 54. The rotation reversing assembly 54 is suitably supported below support platform 12 such that the sprocket members 48 and 52 are in coplanar relation. An upper sprocket 56, identical to sprocket 52, is supported in driven relation on the rotation reversing assembly 54 and has a conventional endless chain 58 operatively associated therewith. The chain 58, which is substantially identical to chain 50, is also operatively associated with a sprocket member 60 which is identical to sprocket member 48. The sprocket 60 is fixedly secured in normal relation to the lower end of the support shaft 36 of the sprocket member 30 opposite the sprocket member 30 which is driven directly from the speed reducer means 42, with the sprocket members 56 and 60 lying in coplanar relation. It can be seen that rotational movement of output shaft 44 of the speed reducer 42, and thus rotational driving of the associated sprocket 30, will effect an equal and opposite rotational driving of the opposite sprocket 30 through the reversing means 54 with resulting equal translation movement of the opposing sections of the conveyor chains 34 in the same direction.

Referring now to FIGURES 3 and 4, the conveyor chains 34 are of generally conventional construction comprising upper and lower pivotally connected link members, with the upper and lower pivotally connected link members being maintained in parallel spaced relation through connecting pins. The conveyor chains have a plurality of upper link members 76, 78 pivotally connected in alternating relation through connecting pins 80 in a conventional manner. The alternating link members 78 include upstanding flange portions 82, with certain of the link members 78 serving to support the guide members 28 and 29 as described below. The bottom links of the conveyor chains 34 comprise pivotally connected links 76 which are spaced from the upper links 76, 78 through the connecting pins 80 in a known manner.

As noted, certain of the upper link members 78 serve to support rear guide members 28 through their upstanding flange portions 82, while other selected link members 78 serve to support the forward guide members 29. The rear and forward guide members 28, 29, respectively, are alternately spaced about the longitudinal length of each of the conveyor chains 34. Each rearward guide member 28 and its corresponding next forward guide member 29 are spaced a distance slightly greater than the distance between the outer peripheral portions of an adjacent pair of roller members 24 on a pallet 10 when the pallet is being moved along the support surface 12 through the pushing action of the rearward guide members 28. Noting FIGURES 1 and 2, each pair of rearward and forward guide members 28, 29 on their respective conveyor chain 34 is in opposite relation to a similar pair of rearward and forward guide members 28, 29 on the opposing conveyor chain. The spaced rear and forward guide members 28, 29 maintain the pallets in fixed relation along the lengths of the chains 34 as the pallets are moved along the support surface 12.

Each of the rear guide members 28 includes a generally horizontally extending flange portion 84 to which is secured a screw support plate 86 and an inverted L-shaped pallet engaging portion 88. The guide members 28 may be fixedly secured to their respective upstanding support flanges 82 through screws 90 and nuts 92. The inverted L-shaped pallet engaging portions 88 have depending legs 94 which, when the guide members 28 are secured to their supporting links 78, are disposed in generally normal relation to the supporting platform 12. The depending legs 94 have recesses 96 therein which receive cylindrical roller members 98 in rotatable relation. The cylindrical rollers 98 are provided with axial bores which receive annular nylon bushings 100 therein, with the bores of the nylon bushings receiving roll pins 102 therethrough. The ends of the roll pins 102 are supported within apertures 104 in the depending legs 94 such that the rollers 98 are disposed in horizontal relation. Each of the inverted L-shaped pallet engaging portions 88 includes a generally horizontally extending portion 95 which has a pair of apertures 106 therethrough to receive the ends of a U-shaped clamp 108 (FIGURE 1) for securing a T pipe fluid conduit connector to each guide member 28, as will be more fully described hereinbelow. While the opposing rearward guide members 28 secured to their respective conveyor chains 34 are of similar configuration, it will be understood that the opposing pairs of guide members are mirror images of each other. During movement of a pallet 10 along the support surface 12, the depending legs 94 of the guide members 28 engage the rear roller members 24 of the pallet in pushing relation. The horizontally extending portions 95 extend in a forward direction relative to the legs 94 so as to overlie the rollers 24 and their respective support projections 26 on the pallet during movement thereof in a direction indicated by arrow 97. As described below, the depending legs 94 are of a height sufficient to provide rolling engagement between the rollers 98 and the support surface 12 during movement of the guide members with their associated guide chains 34.

The forward guide members 29 are generally similar to their associated paired rearward guide members 28 and are secured to selected upstanding portions 82 of the upper chain links 78 in similar fashion to the rearward guide members 28. The forward guide members 29 include inverted L-shaped portions 89 which have depending legs 91 and horizontally extending portions 93. The depending legs 91 have rollers 98 rotatably supported thereon in a similar manner to the rollers 98 on the rearward guide members 28. The horizontal portions 93 of the forward guide members 29 extend rearwardly relative to the depending legs 91, when considered with the direction of pallet movement being in a forward direction as shown by arrow 97, so as to overlie the forward rollers 24 and the associated projections 26 on a pallet 10 during movement thereof along the support surface. The horizontal portions 93 of guide member 29 also have apertures 106 therein to receive U-shaped brackets 108 which serve to retain straight-through conduit fittings to certain of the guide members 29, as will become more apparent hereinbelow. The rearward guide members 28 and the forward guide members 29, when considered in pairs as above described to engage forward and rearward roller members 24 on a pallet 10, comprise guide means supported on the conveyor chains 34 which serve to affect movement of a pallet 10 along the support surface 12 upon translational movement of the conveyor chains 34.

Referring to FIGURE 3, taken in conjunction with FIGURE 1, the above noted chain track members 35 provide a means for guiding the conveyor chains 34 intermediate their respective supporting sprocket members 30. The chain track members 35 are positioned in coinciding relation with the longitudinal axes of the portions of the conveyor chains 34 between their respective supporting sprockets 30 and include longitudinally extending openings 72 which partially receive the chains 34 in guiding relation therewith. The chain tracks 35 serve to prevent side play or whipping of the conveyor chains during translational movement between their respective support sprockets 30. The chain track members preferably extend substantially the full distance between the respective pairs of sprocket members 30, with two such chain track members being provided for each conveyor chain 34. Noting FIGURE 3, each of the chain track members 35 comprises a base plate portion 110, a pair of spaced nylon bearing strip portions 112, a pair of spaced spacer plates 118, and a pair of spaced upper retainer plates 122, all of which are retained in stacked relation through screw members 126 and bolts 128. The nylon bearing strips 112, the spacer plates 118, and the upper retainer plates 122 are spaced apart to define the opening 72 which partially receives the conveyor chains 34. The opening 72 has a cross-sectional configuration similar to that of a conveyor chain 34 when considered through one of the pivot connecting pins 80, with the nylon bearing strips 112 being spaced apart as at 114 to provide clearance for the peened knob portions 116 of the pins 80 which retain the lower links 76 in assembled relation. The bearing strips 112 provide a bearing surface for the lower surfaces of the lower links 76 of the conveyor chains during translational movement thereof within the openings 72 of the chain tracks.

The chain tracks 35 are secured to the support surface 12 through the bolts 128 which are received within associated threaded apertures within the support surface. The vertical heights of the chain tracks 35 and their corresponding openings 72, the vertical distances that the conveyor chains 34 are spaced above the support surface 12, and the vertical heights of the depending leg portions 94, 91 of the guide members 28, 29, respectively, are established to ensure that the rollers 98 of the guide members engage the support surface 12 in rolling relation thereon and that the horizontal portions 95, 93 of the rear and forward guide members 28, 29, respectively, overlie the projecting portions 26 on the platform 16 of a pallet 10 when disposed in engaging relation with the guide members 28, 29.

Referring again to FIGURE 1, taken in conjunction with FIGURE 2, means for supplying fluid pressure to the inflatable pads 18 of a pallet 10 through its inlet conduit coupling 20 during movement of the pallet are supported in operative association with one of the conveyor chains 34 and includes a continuous length of fluid pressure conduit, indicated generally at 130. The continuous length fluid pressure conduit 130 has a looped length substantially equal to the looped length of its associated endless conveyor chain 34 and is supported by the chain for movement therewith. The conduit 130 comprises a plurality of flexible conduit sections 146 which are coupled in end-to-end relation through T pipe fittings 148 and straight-through connectors or fittings 150. The conduit sections 146 have lengths substantially equal to the distances between their associated spaced guide members 28, 29. The T pipe fittings or connectors 148 are supported in fixed relation on the horizontally extending portions 95 of the rear guide members 28 through U-shaped brackets 108, while the straight-through connectors 150 are similarly fixedly secured to the horizontal portions 93 of the forward guide members 29 through U-bolts 108. The series connected flexible conduit sections 146 thus comprise the continuous length or closed loop fluid pressure conduit 130 which moves with the conveyor chain 34 upon which it is mounted through the associated guide members 28, 29. It will be understood that as the conduit 130 is supported on one of the pair of conveyor chains 34, the horizontal portions 93, 95 of the opposing forward and rear guide members need not include the apertures 106 to receive U-shaped brackets 108.

Each of the T pipe fittings 148 has a flexible generally fixed length fluid pressure conduit 151 suitably connected to the T portion thereof which extends in generally normal relation to the longitudinal axis of the continuous fluid pressure conduit 130 and lies in a plane parallel to the support surface 12, when considered at its point of connection to the pipe fitting 148. The fluid pressure condits 151 are of relatively short length when compared to the length of the continuous fluid pressure conduit 130 and have conventional quick disconnect couplings 152 suitably secured to the ends thereof opposite the pipe fittings 148 which allow the fluid pressure conduits 151 to be readily connected to the fluid pressure inlet couplings 20 of the pallets 10. The relatively short fluid pressure conduits 151 are preferably of a length sufficient to allow the conduits 151 to be readily connected to the pallets 10 during introduction of the pallets into the path defined by the conveyor chains 34 and chain tracks 35. It will be understood that the quick disconnect couplings 152 include conventional valve means therein which preclude fluid pressure flow through the conduits 151 when not connected to an inlet conduit coupling 20 of a pallet 10.

One of the straight-through fittings 150 in the continuous fluid pressure conduit 130 has an elbow fitting 154 suitably secured thereto in fluid communicating relation. The outer end of the elbow 154 has a relatively stiff fluid pressure conduit 156 suitably secured thereto, with the conduit 156 being also suitably secured to a swivel joint or coupling 158. The swivel coupling 158 is connected to the outer end of a non-flexible fluid pressure conduit 160 in a conventional manner to allow rotational movement of the conduit 156 about the vertical axis of rotation of the swivel coupling 158. The end of the non-flexible conduit 160 opposite the swivel coupling 158 is secured to and supported by a bracket member 162 and is connected in fluid communication with a pair of generally parallel fluid pressure conduits 164. The fluid conduits 164 extend through generally horizontally disposed longitudinally extending openings 168 of a casing 166, which casing or housing supports the support bracket 162 through support blocks 170 received within the openings 168. The housing 166 serves to enclose means for supplying fluid pressure to the conduits 164 and effecting linear reciprocating motion of the conduits 164 and 160, as well as the support bracket 162. Such means for supplying fluid pressure to the conduits 160, 164 and effecting linear reciprocating movement thereof in a substantially horizontal plane serves to control movement of the conduit 160 between positions wherein the axis of the swivel coupling 150 is coincident with the axes of rotation of the support shafts 36 supporting the pair of sprocket members 30 upon which the associated conveyor chain 34 is supported. The conduits 156, 160 and 164 are supported above the level of the continuous length fluid pressure conduit 130 so as to preclude possible interference between the conduit 156, the conveyor chain 34, and the associated chain tracks 35.

It will be understood that the means for providing linearly reciprocating movement of the conduits 160, 164 includes means to effect a dwell period at the end of each stroke, during which dwell period the conduit 156 rotates about the axis of the swivel coupling 158 to a point where a line connecting the rotational axis of the swivel coupling 158 and the center of the elbow coupling 154 is normal to the longitudinal axes of the conveyor chain 34 between the sprockets 30. The means within the casing 166 for effecting such fluid pressure supply and linear reciprocating movement of the conduit 160 may comprise a pair of parallel supported commercially available travel air hose carriers as are manufactured by Ingersoll-Rand Company, 11 Broadway, New York, N.Y. With such a linear reciprocating fluid pressure supply, the continuous fluid pressure conduit 130 may be freely moved in operative relation with its associated conveyor chain 34 and will receive a continual supply of fluid pressure from the conduit 160. Such fluid pressure may then be selectively readily supplied to the inflatable pads 18 of a pallet 10 through a fixed length flexible fluid pressure conduit 151 by connecting the quick disconnect coupling 152 thereon to the inlet coupling 20 of the pallet.

Preferably, a pair of guide rails 172 are fixedly secured in generally parallel relation on the supporting platform 12 just forward of the driven sprocket members 30 and their associated conveyor chains 34, as illustrated in FIGURE 1. The guide rails 172 provide a guide means through which a pallet 10 may be moved to properly position the pallet prior to being introduced between the conveyor chain 34 and guide members 28, 29 for movement along the support surface 12. The ends of the guide rails 172 may be flared outwardly, as at 174, to allow a pallet to be more readily adjusted by hand on the support surface 12 as it is introduced between the conveyor chains.

Referring to FIGURES 5 and 6, taken in conjunction with FIGURES 1 and 2, a control switch means, indicated generally at 176, is provided adjacent the support surface 12 slightly rearward of the driven sprocket members 30 (FIGURE 1) and slightly offset from a longitudinal centerline disposed halfway between the conveyor chains 34. The control switch means 176 is positioned such that as a pallet 10 is moved to a position between the guide rails 172 preparatory to be introduced between the conveyor chains 34 for movement along the support surface 12, the inflatable pads 18 on one side of the bottom surface of the platform 16 will depress a control lever 178 which is supported to project upwardly through a generally rectangular opening 180 in the support surface 12.

The control lever 178 is suitably secured to a horizontal support pin 182 which is rotatably supported by a pair of bearing members 184 and retained therein through spacers 186 and cotter pins 188. The support bearings 184 are suitably secured through bolts 190 to the underside of a bracket 192 which, in turn, is suitably secured to the underside of the support platform 12 through cap screws 194. The control lever 178 is generally U-shaped (FIGURE 6) with the closed end portion having weights 196 suitably secured thereto which urge the upper end of the control level to a position raised from the upper surface of the support platform 12. A contact bolt 198 having a jam nut 200 is received within an aperture in a bracket member 202 secured to the short leg portion of the U-shaped control lever 178, such that the bolt 198 will engage a conventional control switch, indicated schematically at 204, which is conductively connected in a conventional manner to the control circuit for the drive motor 38 of the sprocket members 30. The conventional control switch 204 and its operative association with the bolt 198 is such that when the control lever 178 of the switch 176 is depressed by an inflatable pad 18 of a pallet 10, the drive motor 38 and correspondingly the rotational movement of the driven sprocket members 30 will be stopped.

Noting FIGURE 2, the control lever 178 and the rectangular opening 180 in the support surface 12 are positioned such that the control lever will be maintained in a depressed position through engagement with the inflatable pads 18 of a pallet until the rearward roller members 24 on the pallet are in a position to be engaged by the rear guide members 28 on the conveyor chains 34. When the pallet has reached such a position, the control lever 178 will be urged upwardly by the weights 196 about the support shaft 182 to close the control switch 204 and thus re-energize the drive motor 38 for rotational movement of the driven sprocket members 30. When in its normal upward position above the support surface 12, the switch control lever 178 also serves to prevent rearward movement of a pallet after it has moved over the switch 176. It will be understood that the control switch 204 may be provided in a control circuit that also includes a manually operable on-off switch which must be closed by the operator to close the circuit to the control motor 38. In the latter case, the control switch 204 would prevent accidental actuation of the drive motor 38 by the operator when a pallet is disposed over the switch 176 depressing the control lever 178.

Referring to FIGURE 1, taken in conjunction with FIGURE 7, a plurality of retaining bracket members 206 are provided along the continuous length fluid conduit 130 to receive and retain the outer ends of the short length fluid pressure conduits 151 when not in coupled relation with a pallet 10. Each of the brackets 206 is positioned forwardly of an associated T connector 148 and includes a pair of upstanding leg portions which define a recess 208 therebetween of a size sufficient to snugly receive a reduced diameter portion 210 provided on each of the quick disconnect couplings 152 on the outer ends of the conduits 151. The retaining brackets 206 may be suitably secured to their respective conduit sections 146 in any suitable manner, such as by straps 212 and tightening screws 214. The brackets 206 thus serve to prevent uncontrolled movement of the loose ends of the conduits 151 when not coupled to a pallet.

Having thus described the components comprising a preferred embodiment of a pallet conveyor arrangement in accordance with the present invention, its operation will now be briefly described. When it is desired to move a pallet 10 and an associated load 14 along the support surface 12 through controlled movement thereof along the path defined by opposed conveyor chains 34 and their associated chain tracks 35, the pallet is brought to a position within the guide rails 172 by the operator. At this time, the inflatable pads 18 of the pallet are supplied with a fluid pressure, such as air, from an external source. The pallet is then manually moved forward toward the conveyor chains 34 whereupon it depresses the control switch lever 178 to stop the drive motor 38 and thus stop translational movement of the conveyor chains 34. The operator then manually moves the pallet 10 forwardly to engage a pair of forward guide members 29 and connects the next available supply conduit 151 to the inlet coupling 20 of the pallet. Preferably, the speed reducer 42 and electric drive motor 38 are such as to allow movement of the drive sprockets 30 and chain 34 when the drive motor is de-energized so that the pallet 10 may be moved to a position wherein the rearward guide members 28 are about to engage the rear rollers 24 of the pallet. As noted, when this position is reached, the control lever 178 is released to a position above the support surface 12 whereupon the control switch 204 is closed to allow the drive motor 38 to again be energized to rotate the driven sprockets 30 and to correspondingly move the conveyor chains 34. The pallet will thereupon be moved automatically along the support surface 12 in guided relation by the guide members 28, 29 until the conveyor chains 34 are stopped at a point where the pallet 10 reaches a test station or other point where an operation is to be performed upon the load 14.

It will be understood that the endless conveyor chains 34 may be of any desired length with the length of the continuous fluid pressure conduit 130 and the stroke of the linearly reciprocable conduit 160 being correspondingly increased or decreased. Further, the number of pairs of guide members 28, 29 may be readily varied along the conveyor chains 34, it being a matter of the size of the pallets to be moved along the support surface 12 and the desired spacing between pallets.

It will be understood that while the above described pallet conveyor arrangement has been illustrated as utilizing two opposed conveyor chains 34 with associated pairs of guide members 28, 29, one of the conveyor chains may be eliminated and the guide members 28, 29 on the remaining single conveyor chain readily adapted to retain a pallet in fixed relation to the single chain during movement of the pallet along the support surface. Moreover, it may at times be desirable to eliminate the rear guide members 28 and modify the forward guide members 29 to pull the pallets along the support surface.

I claim:

1. A conveyor arrangement for effecting movement of material handling pallets having inflatable pads thereon along a support surface, comprising, in combination, movable means supported on the support surface in generally fixed relation thereto and defining a fixed path of travel along the support surface, said movable means being adapted to effect controlled movement of pallets along said fixed path, said movable means including guide means adapted to engage the pallets in guiding relation therewith during movement along the fixed path, and fluid pressure supply means supported by said movable means and adapted to provide a continual supply of fluid pressure to the inflatable pads of each pallet as it is moved in controlled relation along the support surface by said movable means.

2. A conveyor arrangement as defined in claim 1 wherein said movable means includes at least one endless conveyor chain supported in driven relation on a pair of spaced sprocket members.

3. A conveyor arrangement as defined in claim 1 wherein said movable means includes a pair of endless conveyor chains supported in driven relation on the support surface, said chains being positioned to define said fixed path therebetween which receives the pallets therein for controlled movement along the support surface.

4. A conveyor arrangement as defined in claim 1 wherein said guide means comprises a plurality of guide members secured in spaced relation on said movable means, said guide members being adapted to engage a pallet during movement of said movable means to maintain the pallet in fixed relation to said movable means during movement of the pallet along the fixed path.

5. A conveyor arrangement as defined in claim 1 including mechanically operable control switch means adapted to be actuated by a pallet as the pallet is moved to a position to be engaged by said guide means, said switch means being further adapted to prevent movement of said movable means while said switch is being actuated by a pallet.

6. A conveyor arrangement for effecting movement of material handling pallets having inflatable pads thereon along a support surface, comprising, in combination, movable means supported on the support surface and adapted to effect controlled movement of pallets along the support surface, said movable means including guide means adapted to engage the pallets in guiding relation therewith during movement along the support surface, fluid pressure supply means operatively associated with said movable means and adapted to provide a continual supply of fluid pressure to the inflatable pads of each pallet as it is moved in controlled relation along the support surface by said movable means, and control switch means including a control lever movable from a first position above the plane of the support surface to a depressed position below the support surface when engaged by a pallet as the pallet is moved to a position to be engaged by said guide means, said switch means being further adapted to prevent movement of said movable means while said switch is being actuated by a pallet, said control lever being adapted to prevent rearward movement of a pallet over said control lever after the pallet has passed over said lever in a forward direction.

7. A conveyor arrangement as defined in claim 2 including chain track members adapted to guide said endless chain when disposed between said spaced sprocket members.

8. A conveyor arrangement as defined in claim 1 wherein said fluid pressure supply means includes a plurality of relatively fixed length fluid pressure conduits disposed in spaced relation on said movable means, each of said fixed length conduits being adapted to be selectively connected to the inflatable pads of a pallet as the pallet is moved along the support surface by said movable means.

9. A conveyor arrangement as defined in claim 8 including a plurality of conduit retaining brackets mounted on said fluid pressure supply means, said retaining brackets being adapted to retain said short length conduits in fixed relation to said supply means when not connected to the inflatable pads of a pallet.

10. A conveyor arrangement for effecting movement of material handling pallets having inflatable pads thereon along a support surface, comprising, in combination, movable means including a pair of endless conveyor chains supported in driven relation on the support surface, said chains being positioned to define a path therebetween which receives the pallets therein and being adapted to effect controlled movement of pallets along said path, said movable means including guide means adapted to engage the pallets in guiding relation therewith during movement along said path, and fluid pressure supply means adapted to provide a continual supply of fluid pressure to the inflatable pads of each pallet as it is moved in controlled relation along said pad by said endless conveyor chains, aid fluid pressure supply means including a continuous length of fluid pressure conduit supported in generally overlying relation on one chain of said pair of endless conveyor chains so as to be movable therewith, and a linearly reciprocable fluid pressure conduit connected to said continuous length of conduit to supply fluid pressure thereto.

11. A conveyor arrangement as defined in claim 10 wherein said linearly reciprocable fluid pressure conduit is connected to said continuous length of conduit through a swivel coupling.

12. A conveyor arrangement as defined in claim 10 wherein said fluid pressure supply means further includes a plurality of spaced conduit members having one end thereof connected to said continuous length of fluid pressure conduit and the opposite ends adapted to be selectively coupled to the inflatable pads of the pallets.

13. A conveyor arrangement as defined in claim 10 wherein said pair of endless conveyor chains are supported in driven relation on pairs of spaced sprocket members, said sprocket members being supported on said support surface in planar spaced relation thereto.

14. For use with a conveyor arrangement including at least one endless chain or the like defining a fixed path of travel along a support surface and adapted for generally translational movement to effect controlled movement of a material handling pallet having inflatable pads thereon along the fixed path; fluid pressure supply means for supplying fluid pressure to the inflatable pads of the pallet as it is moved along the fixed path by the endless chain, said fluid pressure supply means comprising a continuous length of fluid pressure conduit supported by and movable with the endless chain, and a fixed length fluid conduit adapted to connect said continuous length of conduit to the inflatable pads of the pallet.

15. Fluid pressure supply means as defined in claim 14 further comprising linearly reciprocable fluid conduit means connected to said continuous length of fluid conduit and movable therewith to supply fluid pressure to said continuous length of conduit and thereby to the inflatable pads of the pallet.

16. Fluid pressure supply means as defined in claim 15 including a plurality of fixed length fluid conduits, each of said fixed length conduits having a quick disconnect coupling thereon to selectively connect said fixed length conduits to the inflatable pads of a plurality of pallets during controlled movement thereof along the support surface.

17. Fluid pressure supply means as defined in claim 15 wherein said linearly reciprocable fluid conduit means is connected to said continuous length of conduit through a swivel coupling.

References Cited
UNITED STATES PATENTS

| | | | |
|---|---|---|---|
| 2,727,345 | 12/1955 | Schoppee | 198—164 X |
| 3,124,209 | 3/1964 | Flipse | 214—15 X |
| 3,232,366 | 2/1966 | Cockerell | 302—29 |
| 3,335,841 | 8/1967 | Klingel et al. | 198—34 |

RICHARD E. AEGERTER, *Primary Examiner.*

U.S. Cl. X.R.
198—164; 214—1